United States Patent
Lee (10) Patent No.: US 7,597,190 B2
(45) Date of Patent: Oct. 6, 2009

(54) BELT INCLUDING A FLEXIBLE RARE EARTH MAGNETIC STRIP AND CONVEYOR UTILIZING A BELT INCLUDING A FLEXIBLE RARE EARTH MAGNETIC STRIP

(76) Inventor: Rick Lee, 1660 Harberson La., Danville, KY (US) 40422

( * ) Notice: Subject to any disclaimer, the term of this patent is extended or adjusted under 35 U.S.C. 154(b) by 714 days.

(21) Appl. No.: 10/966,906

(22) Filed: Oct. 15, 2004

(65) Prior Publication Data

US 2006/0081446 A1    Apr. 20, 2006

(51) Int. Cl.
*B65G 15/30* (2006.01)
*B65G 15/58* (2006.01)
*B65G 21/20* (2006.01)

(52) U.S. Cl. .............. 198/805; 198/618; 198/754; 198/753; 198/762; 198/750.13; 198/468.5

(58) Field of Classification Search ............... 198/805, 198/804, 618, 762, 754, 753, 750.13, 468.5, 198/750

See application file for complete search history.

(56) References Cited

U.S. PATENT DOCUMENTS

| | | | |
|---|---|---|---|
| 2,655,195 A | 10/1953 | Curtis | |
| 2,684,753 A | 7/1954 | Kolbe et al. | |
| 2,873,843 A | 2/1959 | Wilson | |
| 3,169,632 A | 2/1965 | Kain | |
| 3,179,241 A | 4/1965 | Kain | |
| 3,426,887 A | 2/1969 | Ward et al. | |
| 3,620,357 A | 11/1971 | Folkes | |
| 3,788,447 A | 1/1974 | Stephqnoff | |
| 4,315,568 A | 2/1982 | Mojden | |
| 4,337,598 A | 7/1982 | Barth et al. | |
| 4,623,061 A | 11/1986 | Pentith | |
| 4,643,298 A | 2/1987 | Wallaart | |
| 4,823,939 A | 4/1989 | Langhans et al. | |
| 4,864,170 A | 9/1989 | Eguchi | |
| 4,892,186 A | 1/1990 | Frei | |
| 4,981,208 A | 1/1991 | Jones | |
| 5,004,098 A | 4/1991 | Marshall | |
| 5,027,942 A | 7/1991 | Wallaart | |
| 5,147,029 A | 9/1992 | Wadell | |
| 5,165,527 A | 11/1992 | Garbagnati | |
| 5,172,803 A | 12/1992 | Lewin | |
| 5,199,551 A | 4/1993 | Wallaart et al. | |
| 5,295,568 A | 3/1994 | Saito et al. | |
| 5,398,804 A | 3/1995 | Ecker et al. | |
| 5,408,935 A | 4/1995 | Matsui et al. | |
| 5,848,684 A * | 12/1998 | Furlani et al. | 198/805 |
| 5,890,583 A | 4/1999 | Garbagnati | |
| 6,216,852 B1 | 4/2001 | David | |
| 6,237,754 B1 * | 5/2001 | Tjabringa et al. | 198/848 |
| 6,250,474 B1 | 6/2001 | Howell | |
| 6,398,016 B1 | 6/2002 | Maeder et al. | |
| 6,510,941 B2 | 1/2003 | Schermutzki et al. | |
| 6,528,908 B1 * | 3/2003 | Lee | 310/12 |
| 6,571,934 B1 | 6/2003 | Thompson et al. | |
| 6,607,073 B2 | 8/2003 | Buchi et al. | |
| 2003/0040129 A1* | 2/2003 | Shah | 436/526 |

* cited by examiner

*Primary Examiner*—Gene Crawford
*Assistant Examiner*—Kevel P Singh
(74) *Attorney, Agent, or Firm*—Kenneth F. Pearce (57) ABSTRACT

The invention is related to induction driven straight or curved conveyors. Belts of the current invention have a flexible strip of permanent rare earth magnetic composition embedded therein. In combination with the flexible strip, stators induce magnetic flux to advance the conveyor belt.

5 Claims, 9 Drawing Sheets

BELT INCLUDING A FLEXIBLE RARE EARTH MAGNETIC STRIP AND CONVEYOR UTILIZING A BELT INCLUDING A FLEXIBLE RARE EARTH MAGNETIC STRIP

BACKGROUND OF THE INVENTION

1. Field of the Invention

Among other things, the present invention is related to conveyor belts having a flexible strip or stratum of one or more rare earth magnetic compositions embedded therein. Belts of the current invention are particularly useful in the materials handling arts. Stratum can run the entire length of the belt or sections of the flexible permanent magnetic composition can be embedded within the belt. One or more belt stretch limiting members can be positioned proximate the flexible magnetic stratum. Stators in combination with the flexible strip induce magnetic flux for advancing the conveyor belts.

2. Description of the Previous Art

1) U.S. Pat. No. 5,172,803-Lewin, discloses an endless conveyor belt. Endless belt (2) is spanned over downstream and upstream rollers (33) and (34). Belt (2) has an inner surface (10) provided at each of the reinforced zones (6), (7) and (8) with ridge (9) in which is imbedded permanent magnet (5). Under each magnet (5) is a respective stator (4) that can be energized by alternating current. Lewin also teaches embedding rectangular, flat, cylindrical, ridged, particulate, meshed and powdered permanent magnets into ridge (9) and or flat permanent magnets into ridge (58). According to the '803 Patent, the permanent magnets are fixed to the linear surface of the belt in combination with a juxtaposed stator to form a linear motor for advancing his upper stretch downstream.

2) U.S. Pat. No. 2,655,195-Curtis enables a rubberized magnetic conveyor belt. The '195 Patent's flexible resilient rubber-like layers (12) including the Curtis magnetic composition are impregnated into and disposed over layers (11) by frictioning or coating and serve to bond layers (11) into the belt carcass. Multiple layers of the Curtis magnetic composition are required for the Curtis belt to function. And each of the multiple layers of the '195 magnetic composition runs the width and the length of the belt carcass. Importantly, Magnetite is the only magnetic composition disclosed in the '195 Patent.

3) U.S. Pat. No. 3,169,632-Kain and U.S. Pat. No. 3,179,241-Kane-enable a magnetic flexible cable incorporated into the conveyor belt. Each cable is formed from a plurality of twisted wires. The Kain magnet is mounted in a trough underneath the conveyor belt.

4) U.S. Pat. No. 5,408,935-Matsui, et al., teaches a transportation system utilizing magnetic belt propulsion. The magnet belt conveyor unit (13) uses driving wheel (d) and driven wheel (i) and an endless magnetic belt (1) having a plurality of split magnets enclosed in a yoke extended around the wheels (d) and (i). The split magnets are adapted to be magnetically attracted to the sides of rail (10).

5) U.S. Pat. No. 4,623,061-Pentith enables a belt conveyor. Pentith mounts magnetic blocks (50) to inner face of his belt (14). The blocks (50) are arranged in rows and spaced longitudinally of the belt (14). Recesses (51) are provided between the blocks for ropes (23).

6) U.S. Pat. No. 4,337,598-Barth, et al. discloses an endless belt with automatic steering control. The '598 belt (12) is provided with magnetic sections (26) and (28) which are used in conjunction with magnetic sensors (22) and (24) to track the lateral movement of the belt (12).

7) U.S. Pat. No. 4,892,186-Frei enables a clock conveyor provided with a plurality of entrainment members. Entrainment member (42) can be provided with permanent magnet (51) or soft magnetic plate member (56) to coact with reinforced inserts (17) of belt member (16) or magnetic ledge member (57). The combination of motor (22), sprocket (26), shaft (21) and power take off (23) rather than induction drive the Frei clock conveyor.

8) U.S. Pat. No. 6,298,016 B1-Maeder, et al. discloses a conveyor device. Maeder arranges a flux-conducting member (5) on the first side of guide rail (1). The member (5) consists of parts (5a) and (5b) of the permanent magnet (4). The '016 Patent discloses that a ferromagnetic guide is fixed to the guiding rail while the transport is composed of aluminum or plastic. Flux-conducting member (5) includes magnet (4) with flux conducting parts (5a) and (5b) which in combination with air gap (8a) and flux conducting parts (3c) form the magnetic circuit (8). Maeder, et al. is silent regarding the use of any conveying belt.

9) U.S. Pat. No. 5,147,029-Wadell enables an electromagnetically driven conveyor. Among other things, the Wadell conveyor requires an endless enclosure (10) surrounded by electromagnetic drives (20) and (21). The '029 Patent mandates that the carrier units (22) transport the load. Wadell also teaches that his invention advantageously occupies less space than required by belt conveyors.

10) U.S. Pat. No. 6,607,073 B2-Buchi, et al. discloses a conveyor system. The Buchi permanent magnets (12) are iron magnets. As shown in FIGS. 4 and 5, rotating drive belts (20) carry alternatingly arranged permanent magnets (12). Buchi teaches that the permanent magnets (12) are aligned in rows (11) and that the rows of magnets can be arranged either or the edge or surface of drive belt (20). The '073 Patent is silent regarding any embedment of any magnet inside any belt.

11) U.S. Pat. No. 4,823,939-Langhans, et al. enables a curved path chain conveyor. The '939 Patent's hinged plate links (3) slide along a plastic track (2) having a magnetic strip (6) embedded therein. Langhans ferromagnetic strip (6) is a combination of magnetic power and plastic. Additional ferromagnetic material is incorporated into plastic track (2).

12) U.S. Pat. No. 6,528,908 B1-Lee enables an induction drive for an induction driven conveyor that includes a virtual continuous magnetic body. Lee's virtual continuous magnetic body (150) includes a plurality of pivotable magnets (190, 192, 194, 196, 198, etc.) attached to the roller engaging side (132) of nonmagnetic endless conveyor belt (130). The '908 Patent is silent regarding the embedment of magnetic material inside the Lee conveyor belt (130).

13) U.S. Pat. No. 3,620,357-Folkes teaches a belt conveyor for passengers. The '357 Patent's belt is supported by magnetic repulsion. Magnetization is such that polarity of outer surface of layer (15) and the outer surface of support layer (17) are the same. Thus, in use, there is a distributed upward thrust on the belt. Primarily, Folkes utilizes barium ferrite for his magnetizable material distributed in his belt, but strontium as well as lead ferrite also are functional. Folkes does not embed his ferrimagnetic compound inside the belt (10).

14) U.S. Pat. No. 4,315,568-Mojden discloses a magnetic rail arrangement (14) and a belt (16). The '568 Patent is silent regarding the composition of the Mojden belt (16). Moreover, the permanent magnets (48) and (52) are confined in a U-shaped channel (56) of the '568 magnetic rail (14).

15) U.S. Pat. No. 6,510,941 B2-Schermutzki, et al. enables a device for sealing lateral edge areas of an endless conveyor belt. Schermutzki practices an endless steel belt (1). Permanent magnets (8) are placed with the seal arrangements (7)

which are positioned beneath endless steel belt (1). The '941 Patent is silent regarding embedment of any magnets with the endless steel belt (1).

16) U.S. Pat. No. 6,250,474 B1-Howell enables an eddy current magnetic separator for separating nonferrous from ferrous materials. Howell utilizes a non magnetic two-ply poly-rubber or polyurethane belt (10). The '474 Patent is silent regarding embedment of any magnets with the belt (10).

17) U.S. Pat. No. 4,864,170-Eguchi teaches a moving coil linear motor. A bobbin is moved about yokes by the energizing coil. The '170 Patent does not disclose any conveyor belt.

18) U.S. Pat. No. 2,684,753-Kolbe, et. al., enables a magnetic drive for conveyor belts. Each of the drive units (16) includes traction belt (20) that is guided over end rollers (22). One of the rollers (22) receives pulley belt (24) which is directed by pulley (26) that is driven by conventional electric motor (24) connected to standard gear reducer (30). Disposed below each roller (34) is the electromagnetic roll (38) wound about an armature curved to conform with roller (34). Kolbe practices a steel conveyor belt (10) and is silent regarding embedment of any magnets within the belt.

19) U.S. Pat. No. 2,873,843-Wilson discloses a conveyor for moving ferromagnetic license plates. Magnets (32) are secured to the outer surface of inner belt (15) while outer belt (12) is provided with apertures (24). Drive motor (40) turns drive shaft (42) of pulley (26) which rotates inner conveyor (14). When Wilson's magnets (32) contact the surface of the license plates, the license plates are held on the conveyor via magnetic attraction.

20) U.S. Pat. No. 4,643,298-Wallaart enables a magnetic bend for a chain conveyor. Wallaart's base includes two upright legs (2 & 3) that form the rails for the conveyor chain. Permanent magnets (7) are inserted into pockets (13) are formed on the underneath side of legs (2&3). Compressible plastic or rubber (8) between the closure strip (10) and magnet (7) ensure the magnets in pockets (13) are pushed upwards in the bend segment to enable the magnets to exert maximum force of attraction on the chain links (4).

21) U.S. Pat. No. 5,890,583-Garbagnati discloses a magnetic curve for a chain conveyor. Curve (10) includes base (11) and slide portion (12) to which chain conveyor (13) is fastened. Operation of the curve is accomplished by attaching ferromagnets (17) to guide (12) with screws (18).

22) U.S. Pat. No. 5,295,568-Saito, et. al., enables a passenger conveyor. Generally, the conveyor's treadboards move horizontally, but the conveyor can also be utilized as an inclined escalator. Regardless of which Saito embodiment is selected, the flattened linear motor's stators and moving members are positioned horizontally between the advance and return travel paths of the treadboards. Additionally, the '568 Patent teaches that moving member (12) is composed of a nonmagnetic conductor such as aluminum and copper, or a nonmagnetic conductor laminated on the surface of the magnetic material. Moving members (12) are fixed securely to reinforcement member (7B) mounted on the reverse side of treadboard (5). Stators (13) are supported by horizontal members (3) of frame (1) so as to be opposed to moving members (12a & 12b). Energizing stators (13) apply driving force to moving members (12) to move treadboards (5) along advance (4U) and return (4D) guide rails. Saito is silent regarding embedding of any magnetic composition with a belt.

23) U.S. Pat. No. 3,788,447-Stephanoff describes a linear motor conveyor. Stephanoff's guide track (20) includes two halves that are spaced apart to define a slot (40) therebetween. Except for the curve from upper transport run (12a) to lower return run (12b), support surfaces (30 & 32) of guide (20) are horizontal. Vertical stem (18) of conveyor segment (16) is conducting non magnetic copper or aluminum so that a propulsive force will be generated on stem (18) by the traveling field in stators (62). Stators (62) are located on both sides of slot (40) or a laminated core (74) is mounted in guide (20) to provide the return path for electromagnetic flux. Propulsive force in registration with the linear motor stators causes the entire conveyor to circulate around the guide.

24) U.S. Pat. No. 5,027,942-Wallaart teaches a hinged chain conveyor. Rails (3) and (4) have permanent magnets (9) and (10) inserted into at least the bend sections of the rails. The '942 Patent is silent regarding a conveyor belt.

25) U.S. Pat. No. 5,165,527-Garbagnati enables a chain conveyor that includes a magnetizable chain. Magnets (19) are inserted into grooves (15 & 16) of shoulders (11 & 12) of guide track (10) to assist in controlling ferromagnetic chain (14) as the chain moves through bends of the conveyor. The '527 Patent is silent regarding a conveyor belt.

26) U.S. Pat. No. 5,199,551-Wallaart, et. al., discloses a bend segment for a chain conveyor having a plurality of links (4). Wallaart's permanent magnets (8) are arranged in chambers of plastic bend segment. The '551 Patent is silent regarding a conveyor belt.

27) U.S. Pat. No. 5,298,804-Ecker, et. al., enables a curved conveyor belt with supporting frame devoid of belt band rollers. On the opposite side of stator (12), guide ducts (10 & 11) include recess (14) through which running wheel carrier (15) grasps carrying bar (16) and wheels (25 & 26). Wheel carrier (15) is connected to side edges (18 & 19) of belt band (2). Drive is applied via linear motor system (4) that includes stator (12) and magnet (23) that is integrated with crossbar (22) of carrying spar (16).

28) U.S. Pat. No. 3,426,887-Ward, et. al., among other things, discloses the use of introducing a metal strip or applying metallic particulars to the lateral edges of a nonmetallic conveyor belt. The combination of the coil and the ferrous metallic edge forms a type of the Ward linear induction motor. The '887 Patent is silent regarding the embedment of any magnetic composition within conveyor belt (14).

29) U.S. Pat. No. 4,981,208-Jones enables a magnetic spiral conveyor system. Among other things, Jones teaches embedding permanent magnets (32) into the exposed edge of module (28) which contacts the driving bars (26) of the system. In this manner, frictional contact between the conveyor belt and the driving bars is increased. Jones is silent regarding the use of any strip of magnetic composition embedded into the belt (12).

30) U.S. Pat. No. 6,216,852-David discloses a conveyor belt with a lower reinforcing layer. The David conveyor belt (10) has an internal stretch limiting means (76) in the lateral center of the intermediate body section (48). The stretch limiting member is vulcanized into the David conveyor belt (10).

31) U.S. Pat. No. 5,004,098-Marshall enables a conveyor belt. Stretch limiting member (28) is vulcanized into the belt (10'). The Marshall stretch limiter (28) is limited only to the central portion of belt (10').

SUMMARY OF THE INVENTION

Unlike traditional belts, flexible strips or strata are embedded within the belts. In select practices of the invention, the combination of the flexible strip and one or more stators induce a magnetic flux to advance the belt. In some embodiments, the strips run the entire length of the belt, while in other embodiments, only select sections the belt include the permanent magnetic composition. The present invention is particularly useful in the conveying or materials handling arts. Thus, the current invention meets the long felt but previously unfulfilled need of providing an induction driven conveyor including a belt having a flexible solid permanent magnetic composition embedded therein. Prior to the present invention, it is believed that belts with a flexible solid permanent magnetic composition, including one or more rare earth elements, capable of bending with the belt were unknown. Applications of the present invention are compatible with both straight and curved conveyors.

An aspect of the present invention is to provide a bi-directional induction driven conveyor.

Still another aspect of the present invention is to provide an induction drive for a conveyor.

It is another aspect of the present invention to enable a method of using an induction driven conveyor.

Yet another aspect of the present invention is to provide a drive for an endless belt incorporating a flexible strip or stratum of permanent rare earth magnetic composition.

Still another aspect of the present invention is to provide a belt including more than one flexible strip of permanent magnetic composition.

Yet still another aspect of the present invention is to provide a bi-directional induction driven conveyor where the direction of conveyor is reversible by altering the direction of the electric current flowing through the stator.

It is still another aspect of the present invention to provide an induction driven conveyor utilizing at least two stators for generating a cumulative electromagnetic field.

Still another aspect of the present invention is to provide a stratum including a permanent magnetic composition with a residual induction of greater than 1000 Gauss.

Yet still another aspect of the present invention is to provide a flexible solid magnetic strip including either Samarium-Cobalt or Neodymium Iron Boron magnetic compositions or combinations thereof.

It is yet another aspect of the present invention to provide an induction drive that can be utilized in either a straight or a curved conveyor.

Still another aspect of the present invention is to provide an induction drive that can generate from about 248 Watts to about 7.5 Kilowatts.

Yet still another aspect of the present invention is to provide conveyor belts for retrofitting existing conveyors.

It is yet another aspect of the present invention to provide a belt stretch limiting member.

Still another aspect of the present invention is to provide belt including a belt stretch limiter positioned parallel to the flexible magnetic strip.

Yet still another aspect of the present invention is to provide a belt stretch limiter that is connected to the flexible magnetic stratum.

It is yet another aspect of the present invention to provide a belt including at least two belt stretch limiting members.

Still another aspect of the present invention is to provide belt having the flexible magnetic strip adhered therein.

An embodiment of the present invention can be described as a belt for transporting a load, comprising: a first ply, including a first width; a second ply, including a second width; and a flexible stratum, comprising: a permanent magnetic composition, wherein the flexible stratum; and a first stretch limiting member joined to a first side of the flexible stratum.

Another embodiment of the present apparatus can be described as an electromagnetic induction driven bidirectional conveyor, comprising: a frame; a stator located at a predetermined position about the frame; a source of energy for inducing an electromagnetic flux; a guide supported by the frame for directing advancement of an endless load carrying belt, wherein the endless load carrying belt further comprises: a first ply located above a second ply and a flexible magnetic stratum, including one or more rare earth elements, contacting a lower side of the first ply and an upper side of the second ply; and a controller for determining directional advancement of the load carrying belt.

Yet another embodiment of the present device can be described as a conveyor belt, comprising: a first ply situated above a second ply and a flexible magnetic stratum further comprising a flexible permanent rare earth magnetic composition having a residual induction of greater than 5000 Gauss and Neodymium, Samarium or a combination thereof.

In still another embodiment, the present invention can be described as a conveyor belt, comprising: a plurality of belt plies; a flexible magnetic stratum; and a first stretch limiting member positioned on a first side of the flexible magnetic stratum.

Yet another embodiment of the present device can be described as a conveyor belt, comprising: a first ply situated above a second ply; a channel formed in said second ply; and a flexible magnetic stratum seated in said channel creating an induction flux zone, wherein said flexible magnetic stratum further comprises a flexible permanent rare earth magnetic composition having a residual induction of greater than 2000 Gauss and Neodymium, Samarium or a combination thereof In still another embodiment, the present invention can be described as a method for controlling advancement of a conveyor belt, comprising the steps of: creating a conveyor belt by: layering a plurality of plies and positioning a flexible strip of permanent rare earth magnetic composition between a lower side of a first ply and an upper side of a second ply, wherein the flexible strip of permanent rare earth magnetic composition has a residual induction of greater than 2000 Gauss, and locating a first stretch limiting member proximate said flexible strip of permanent rare earth magnetic composition; supporting the conveyor belt about a conveyor frame; locating stators about the conveyor belt; and controlling advancement of the conveyor belt by energizing or de-energizing the stators.

It is the novel and unique interaction of these simple elements which creates the apparatus and methods, within the ambit of the present invention. Pursuant to Title 35 of the United States Code, descriptions of preferred embodiments follow. However, it is to be understood that the best mode descriptions do not limit the scope of the present invention.

DESCRIPTION OF THE PREFERRED EMBODIMENTS

Although the disclosure hereof is detailed to enable those skilled in the art to practice the invention, the embodiments published herein merely exemplify the present invention.

In accordance with the current invention one or more flexible magnetic strips are embedded in a belt. The magnetic strips or strata are generally created from rare earth magnetic compositions. In many embodiments of the current invention, one or more of the magnet strips traverse the entire length of the endless belt. Along with being flexible, the strata can be cohered to have a high density.

In one preferred embodiment of the present invention, a belt including the flexible magnetic stratum is incorporated into a conveyor for transporting loads. In another preferred embodiment, one or more stretch limiting members are integrated into the endless belt. And in still another preferred embodiment, a stretch limiting member is connected with the stratum to assist in anchoring the flexible strip.

Within the scope of the present invention, the conveyor has a guide for directing forward or rearward movement of the belt. The guide has rollers and holders as well as any other elements recognized by those skilled in the art as necessary to direct the movement of the endless belt about the conveyor. Endless belts of the current invention can be utilized to practice both straight and curved conveyors. One or more stators are strategically located about the conveyor for generating a magnetic flux. The stators are aligned with the magnetic strata to create an induction flux zone for driving the conveyor belt. In many embodiments, the stators can be aligned to target the center of the magnetic strata.

Depending upon the magnetic composition of flexible strip, embodiments of the present invention can have a residual induction of from about 1000 Gauss to more than 12000 Gauss. However, the magnetic flexible strips of the current invention generally have a residual induction greater than 8000 Gauss, which differentiates rare earth magnetic compositions them from traditional iron magnetic compositions. In select embodiments, the magnetic strip or stratum, can run the entire length of the endless loop belt. Examples of foreseeable rare earth magnetic compositions or agglomerates which can be practiced with the current invention include the Samarium-Cobalt and the Neodymium Iron Boron magnetic compositions.

Figure 1:
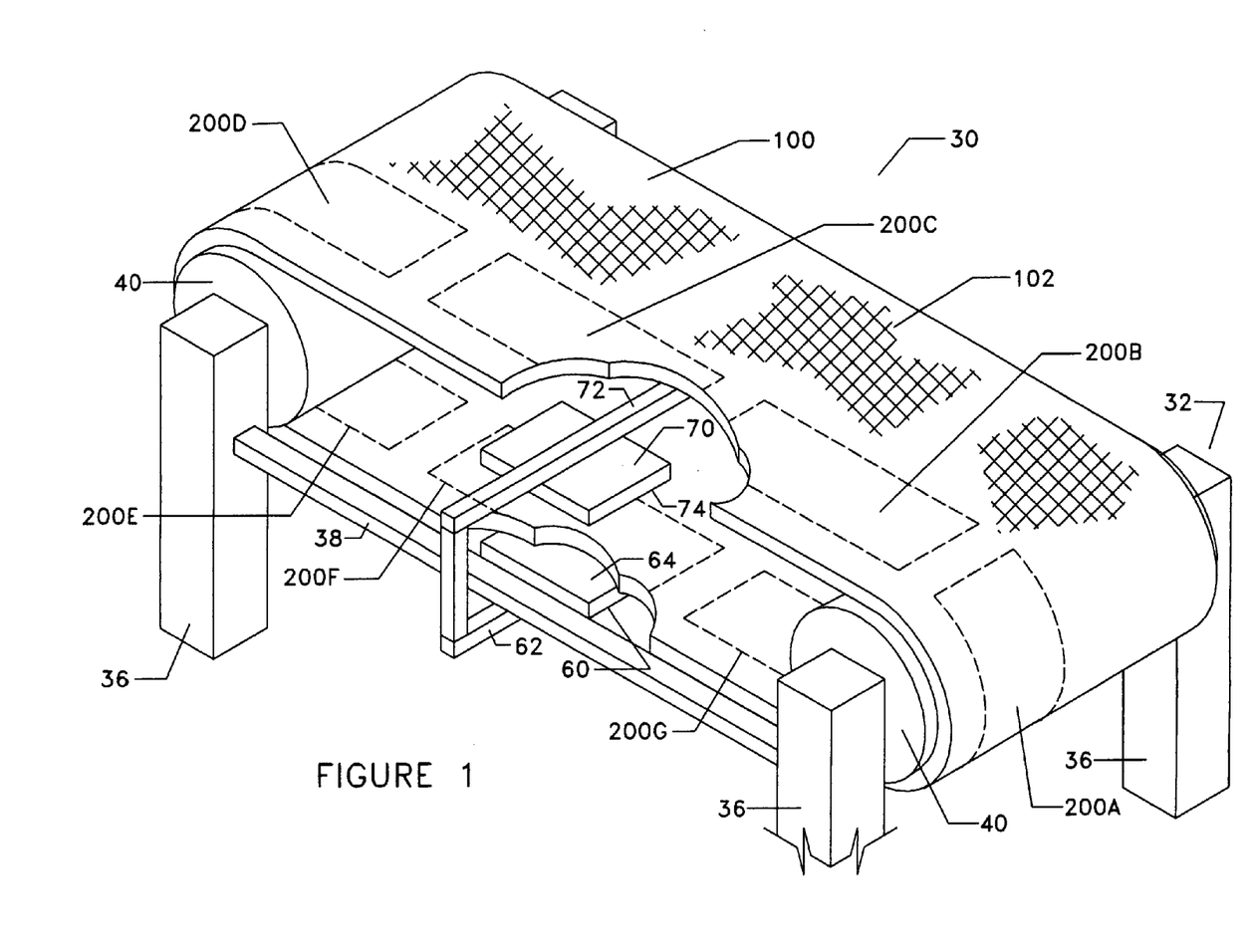
FIG. 1 is a simplistic three-dimensional representation of a conveyor within the scope of the present invention.

FIG. 1 is a simplistic three-dimensional representation of conveyor (30). As shown, conveyor (30) is a straight conveyor, but as previously indicated, curved conveyors are also within the scope of the present invention. Frame (32) includes legs (36) and cross-members (38). As portrayed in FIG. 1, frame (32) supports rollers (40) and stators (60) and (70) and guide (not shown). However, in other embodiments, the frames can also carry load supporting beds that provide additional support for load transporting conveyor belts.

Transverse member (62) runs between cross-members (38) and supports stator (60) and transverse member (72) runs between cross-members (38) and supports stator (70). A source of energy (not shown) supplies power to stators (60) and (70). The number of predetermined stators and rollers (40) are only limited by space and engineering parameters. Projecting face (64) of stator (60) faces outward surface of endless belt (100) and projecting face (74) of stator (70) faces inward surface of endless belt (100).

Belt (100) can be composed of one or more plies (not shown in FIG. 1). Plies of the belt are flexible so that belt (100) can bend about the curves associated with its endless loop construction. As shown, embedded within belt (100) are flexible strips or strata (200A, B, C, D, E, F and G). However, in other embodiments, one or more stratums can run continuously the entire unbroken length of endless belt (100). The present flexible strip (200) is capable of bending, without breaking, as the endless loop winds its way about the conveyor. Flexible strata that do not break provide for greater concentrations of inductive forces to move endless belt (100) forward or backward. As shown in FIG. 1, when the load being transported requires, outward surface of belt (200) can be provided with traction enhancer (102).

Figures 2, 3:
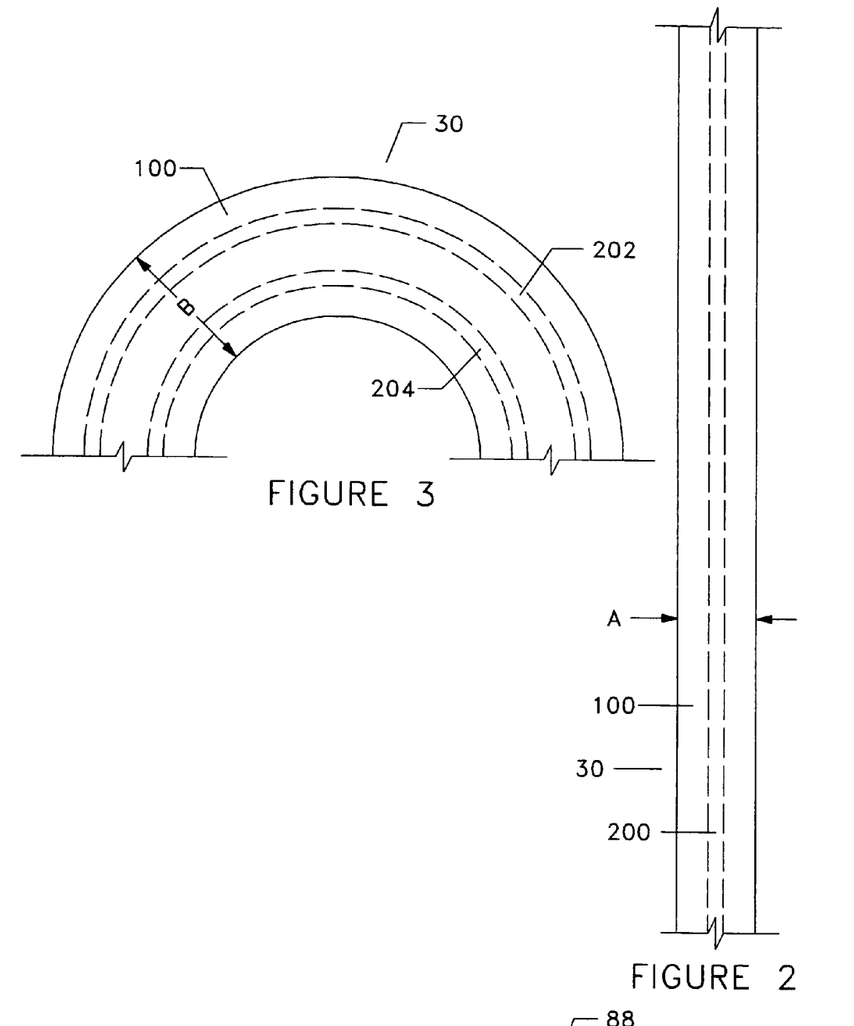
FIG. 2 is a plan view of a conveyor within the scope of the present invention.
FIG. 3 is a top view of conveyor within the scope of the present invention.

FIG. 2 is a plan view of conveyor (30). In this embodiment, conveyor (30) is a straight conveyor. As shown, flexible stratum (200) runs continuously the entire length of belt (100). Arrow A identifies the breadth of one or more plies of belt (100). In this specific embodiment, it is seen that the width of stratum (200) is less than one-third of the breadth of belt (100). Due to the inductive capabilities of the rare earth magnetic compositions of the present invention, the width of stratum (200) can be substantially less than the breadth of belt (100).

Figures 2A, 3A:
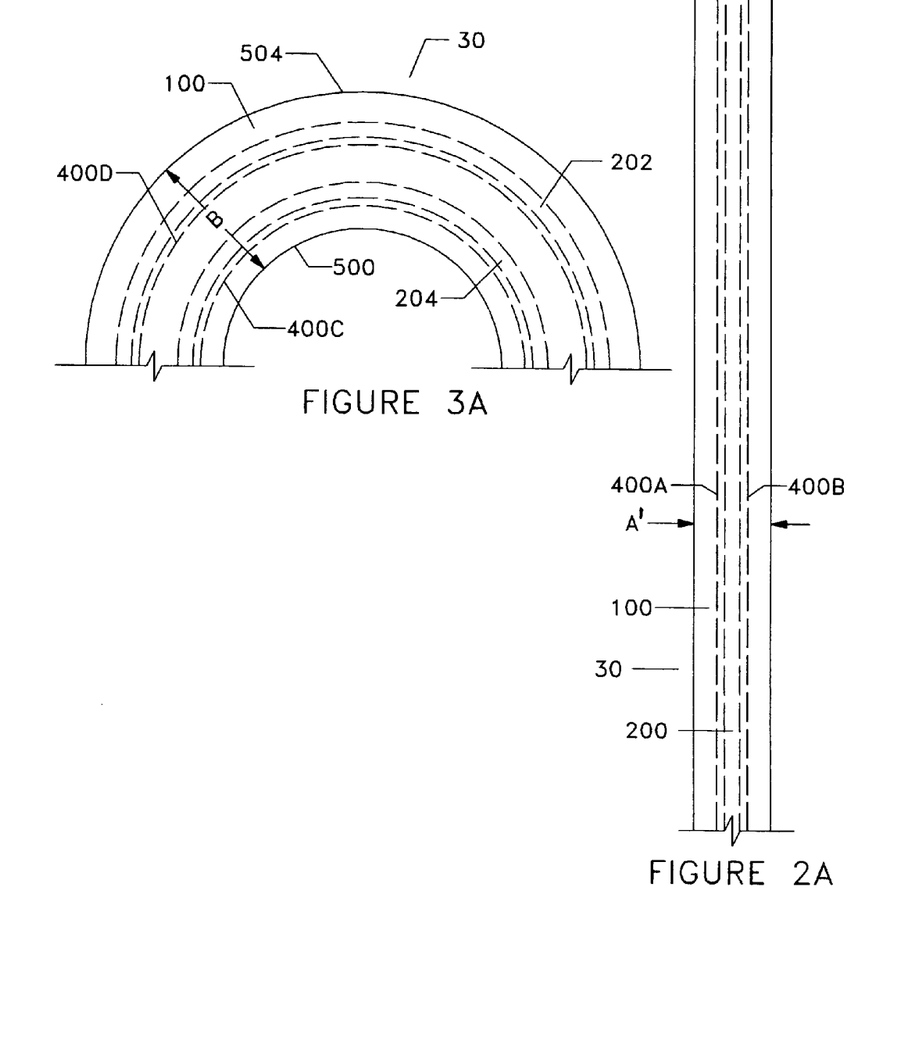
FIG. 2A is plan view of another conveyor within the scope of the present invention.
FIG. 3A is a top view of another conveyor within the scope of the present invention.

FIG. 2A is a plan view of conveyor (30). Arrow $A^1$ indicates the breadth of one or more plies of belt (100). Disposed within the plies of belt (100) on either side of stratum (200) are stretch limiting members (400A) and (400B). Stretch limiting members (400A) and (400B) reduce both the widthwise and the lengthwise stretch associated with continuous use of endless belt (200). Reduction of the belt stretch allows stratum (200) to maintain a more centered inductive flux zone with one or more stators, as endless belt (100) circulates about conveyor (30).

In accordance with the present invention, stretch limiting members are preferably created from aramid fibers. Depending upon engineering parameters, such as the load to be carried by belt (100), the aramid fibers can be woven into a strand, ribbon, cord or the like. An example of an aramid fiber includes those fibers sold under the trademark KEVLAR ® owned by the E. I. DuPont de Nemours & Company.

FIG. 3 is a top view of conveyor (30). As shown, conveyor (30) is a curved conveyor. Arrow B indicates the breadth of one or more plies of belt (100). Stratum (202) and flexible strip (204) run unbrokenly the entire length of belt (100). However, when engineering parameters dictate, stratum (202) or stratum (204) or both can be sectioned such that either stratum does not run continuously the entire length of belt (100). In a similar vein, those skilled in the art recognize that more that one stratum can be included in the belt of a straight conveyor. As shown in FIG. 3, the cumulative widths of stratum (202) and (204) are less than one-third of the breadth of belt (100).

FIG. 3A is a top view of conveyor where belt (100) has stretch limiting members (400C) and (400D) positioned between the plies of belt (100). As shown, stretch limiting member (400C) is situated between stratum (204) and inward radius (500) of belt (100) while stretch limiting member (400D) is located between magnetic stratum (202) and magnetic stratum (204). Although not shown in FIG. 3A, when engineering parameters require, stretch limiting members (400C) and (400D) can be located on the outward radius (504) side of their corresponding stratums. Alternatively, one stretch limiting member can be located on the inward radius side of its corresponding stratum while the other stretch limiting member can be situated on the outward radius side of its corresponding stratus. In yet another embodiment, a single stretch limiting member can be placed inside belt (100).

Figure 4:
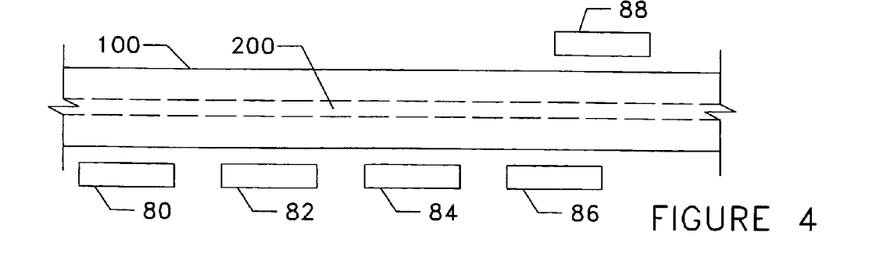
FIG. 4 is a side view of a section of a belt within the scope of the present invention.

FIG. 4 is a side view of a section of belt (100) which can be guided about either a curved or a straight conveyor. As shown, stratum (200) runs the entire unbroken length of belt (100). Positioned above and below belt (100) are stators (80), (82), (84), (86) and (88). In the practice of the present invention, there is a plethora of locations where stators can be positioned, i.e., for a conveyor belt, one or more stators can be positioned on the outward and/or inward side of belt (100).

Within the scope of the present invention, regardless of the specific dimensions for a particular embodiment of the stratum or strata (200) incorporated into belt (100), adequate magnetic flux between the stator or stators and the stratum or strata is generated to advance belt (100). In short, it has unexpectedly been discovered that the small flexible magnetic strips of the present invention in combination with one or more stators can generate adequate flux to advance the belt. And due to the expense of some of the magnetic compositions which can be incorporated into belt (100), engineering parameters can dictate the size of the stratum or strata of belt (100) to be the smallest possible which will generate adequate flux with the stator or stators to advance the belt. Thus, the practice of the current invention allows for small masses of the selected magnetic composition, when compared against the total size of the belt, to advance the belt.

Figure 5:
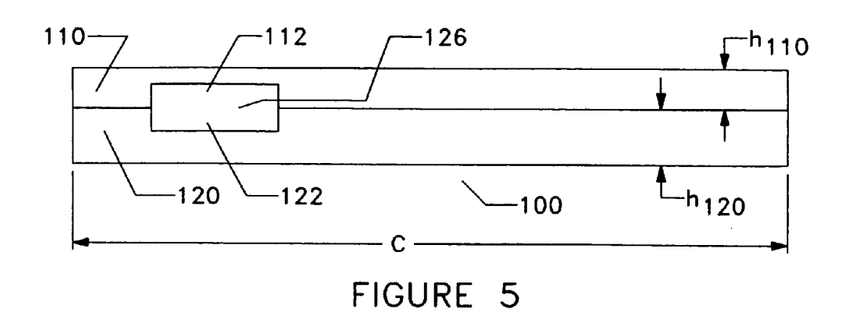
FIG. 5 is a planar cross-sectional view of the breadth C of a conveyor belt within the scope of the present invention.

FIG. 5 is a planar cross-sectional view of the breadth C of conveyor belt (100). Ply (110) and ply (120) are contiguous and bonded in any manner acceptable in the art. As shown, the height $(h_{110})$ of ply (110) is not equal to the height $(h_{120})$ of ply (120). However, depending upon engineering parameters and the loads to be carried by the belt, the heights, i.e., the smallest dimension or thickness of the respective plies of belt may be virtually equidistant. Ply (110) can be manufactured with recess (112) running the length of ply (110) or ply (110) can be made to include serial recesses (not shown in FIG. 5) for receiving the flexible cohesive magnetic composition (not shown in FIG. 5). Similarly, ply (120) can be provided with recess (122) running the length of ply (120) or ply (120) can include serial recesses. When ply (110) and ply (120) are joined, recesses (112) and (122) create channel (126) for holding the flexible cohesive magnetic strip (not shown). Although not shown, when engineering parameters dictate, channel (126) can be formed solely in a single ply, i.e., channel (126) can be formed in either ply (110) or ply (120) rather than partial in both as shown in FIG. 5. In select embodiments, the stratum is adhered to channel (126) to better center the induction flux zone.

As shown in the FIG. 5 embodiment, the width of channel (126) is less than one-fourth the breadth C of either ply (110) or ply (120). Moreover, it has unexpectedly been discovered that a flexible magnetic stratum seated in channel (126) having a cross-sectional area from about 100 square millimeters to about 500 square millimeters in conjunction with one or more stators is capable of generating adequate magnetic flux to advance conveyor belt (100) forward or rearward. Of course, forward or rearward movement of the conveyor belt is determined by the direction of the current flowing into the stators.

Figure 6:
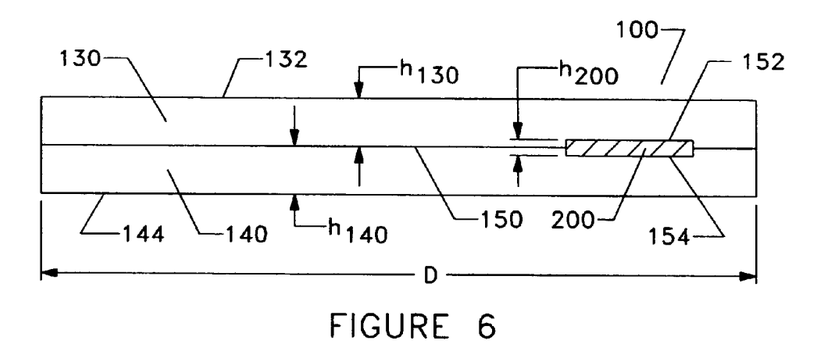
FIG. 6 is a planar cross-sectional view of the breadth D of a conveyor belt within the scope of the present invention.

FIG. 6 is a planar cross-sectional view of the breadth D of conveyor belt (100). As shown in this embodiment, the flexible cohesive magnetic strip or stratum (200) is less than one-fourth the breadth D of either ply (130) or ply (140). Ply (130) and ply (140) are contiguous and bonded in any manner acceptable in the art. In accordance with the present invention, the plies can be composed of rubber, nylon, polyethylene, polyurethane, fabric, blends thereof or other materials acceptable in the art. It has unexpectedly been determined that flexible magnetic strata having a thickness of between 2 millimeters and 5 millimeters and a width as small as 50 millimeters can provide an adequate induction flux zone for one or more stators to target. Moreover, depending upon engineering parameters required to practice the invention, belts can either be static conductive or non static conductive.

As shown in FIG. 6, the height $(h_{130})$ of ply (130) is virtually equidistant to the height $(h_{140})$ of ply (140). However, when engineering considerations dictate, $(h_{130})$ and $(h_{140})$ can be manufactured of different heights. Except for areas (152) and (154) abutting the stratum (200), ply (130) and ply (140) have a contiguous border (150). As previously indicated, magnetic stratum (200) can be adhered areas (152) and (154). Periphery (132) of ply (130) is diametrically opposed to periphery (144) of ply (140).

With reference still to FIG. 6, thin stratum (200) is seated between plies (130) and (140) in such a way as to eliminate the channel practiced in some other embodiments of the present invention. In many embodiments of the current invention, $(h_{200})$ of stratum (200) will be equal to or less than $(h_{130})$ of ply (130) and $(h_{140})$ of ply (140). In other words, the smallest dimension of stratum (200) is equal to or less than the thickness of either ply (130) or ply (140) and can be sandwiched between plies (130) and (140). Such practice of the present invention, eliminates the requirement of a channel for containing the flexible magnetic strip.

Figure 6A:
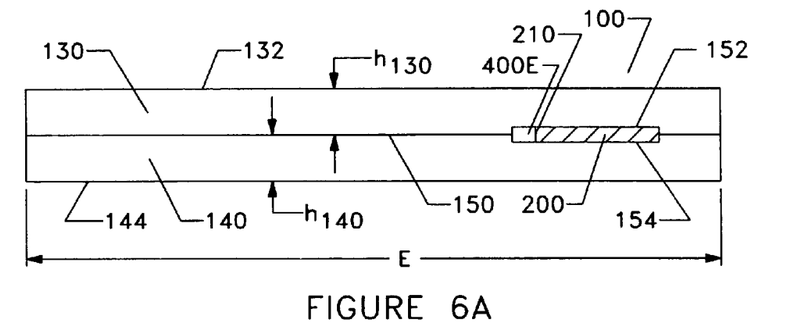
FIG. 6A is a planar cross-sectional view of the breadth D of another conveyor belt within the scope of the present invention.

FIG. 6A is a planar cross-sectional view of the breadth E of conveyor belt (100). Ply (130) and ply (140) are contiguous and bonded in any manner acceptable in the art. Except for areas (152) and (154) abutting the stratum (200), ply (130) and ply (140) have a contiguous border (150). As previously indicated, magnetic stratum (200) can be adhered to areas (152) and (154). Periphery (132) of ply (130) is diametrically opposed to periphery (144) of ply (140).

Through an adhesive bond, stretch limiting member (400E) is connected to first side (210) of magnetic stratum (200). Stretch limiting member (400E) is contiguous with the length of flexible stratum (200). Although not shown in FIG. 6A, a second stretch limiting member can be positioned on the side of stratum (200) opposite stretch limiting member (400E).

For many embodiments of the present invention, a stratum having a cross-sectional area from about 100 square millimeters to about 500 square millimeters in conjunction with one or more stators is capable of generating adequate magnetic flux to advance the conveyor belt forward or rearward. Depending upon the weight of the materials to be carried by the belt, a stator can be configured to generate from about 248 Watts to about 7.5 Kilowatts. Forward or rearward movement of the conveyor belt is determined by the direction of the current flowing into the stators. And a controller determines directional advancement of the load carrying belt.

Figure 7:
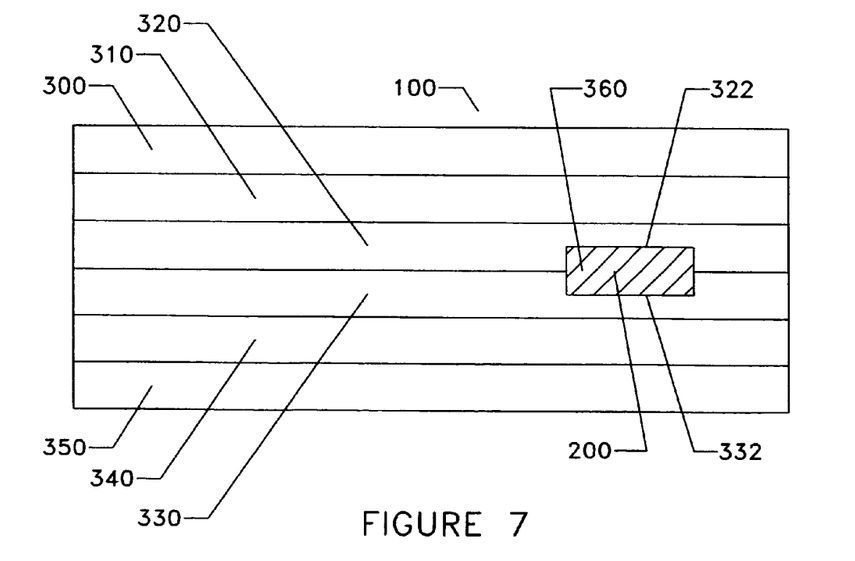
FIG. 7 is a coplanar cross-sectional view of a belt within the scope of the present invention.

FIG. 7 is a coplanar cross-sectional view of a belt within the scope of the present invention. Conveyor belt (100) is composed of a plurality of contiguous plies (300), (310), (320), (330), (340) and (350). In practice, the number of plies for the belt is limited by predetermined design. In this embodiment, the flexible solid magnetic strip (200) rides in channel (360) while recess (322) of ply (320) and recess (332) of ply (330) form channel (360). Plies (300), (310), (320), (330), (340) and (350) are laid on each other in any manner acceptable in the art. And when the load to be carried mandates, any two or more plies (300), (310), (320), (330), (340) and (350) can be cross-woven.

Figure 7A:
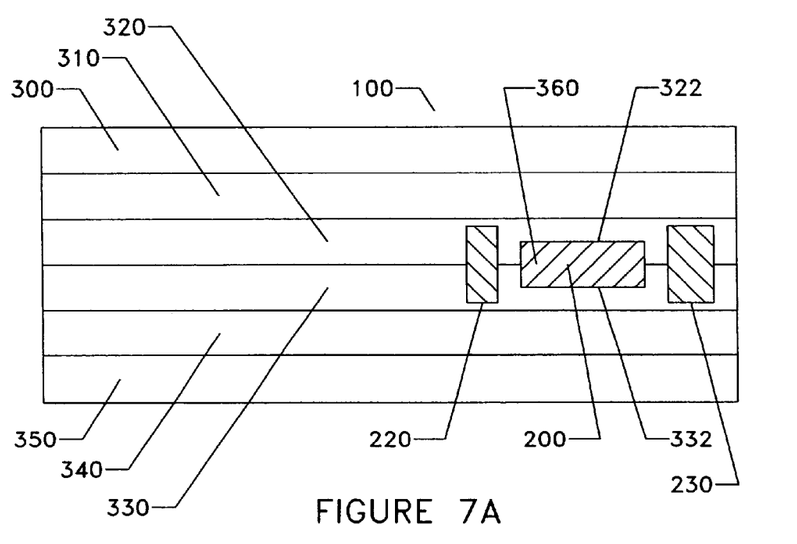
FIG. 7A is a coplanar cross-sectional view of another belt within the scope of the present invention.

FIG. 7A is another coplanar cross-sectional view of a belt within the scope of the present invention. Endless belt (100) includes contiguous plies (300), (310), (320), (330), (340) and (350) and channel (360). Stretch limiting member (220) is positioned on a first side of flexible stratum (200) and stretch limiting member (230) is positioned on a second side of magnetic flexible strip (200). However, as previously enabled, the present invention is functional with less than two stretch limiting members.

Figure 7B:
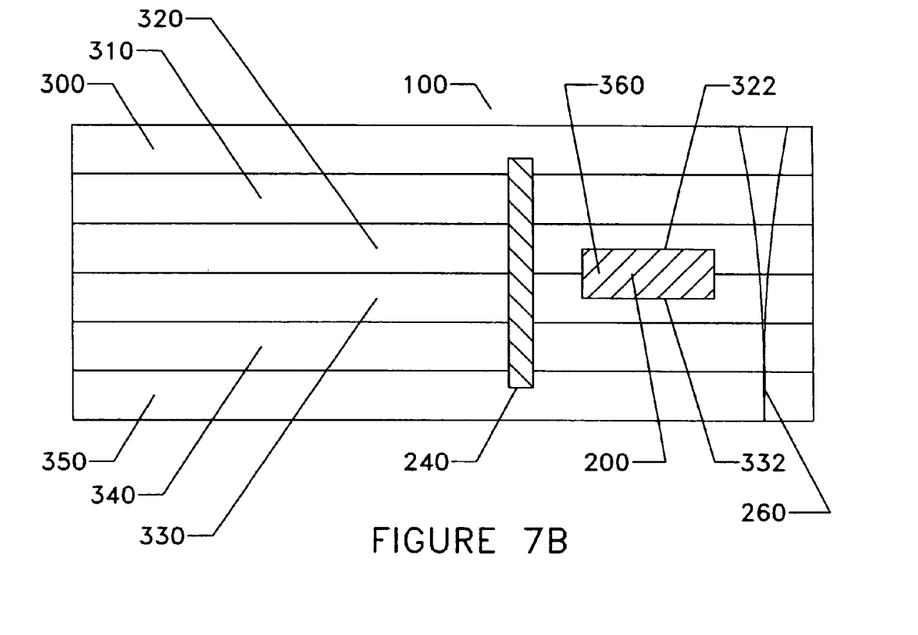
FIG. 7B is a coplanar cross-sectional view of yet another belt within the scope of the present invention.

FIG. 7B is yet another coplanar cross-sectional view of a belt within the scope of the present invention. Except for a different stretch limiter (240) and stitch (260), the remaining elements of the belt are identical to the elements enable in FIG. 7A. In the practice of the present invention, a plurality of stitches (260) can run a length of belt (100) to provide additional anchoring for plies (300), (310), (320), (330), (340) and (350) and flexible magnetic stratum (200) which can also be adhered to channel (360).

Steps associated with the practice of the present invention and method are set forth in FIGS. 8-13. Those steps are related to practice of using the belt structures and conveyor structures previously set forth.

Figure 8:
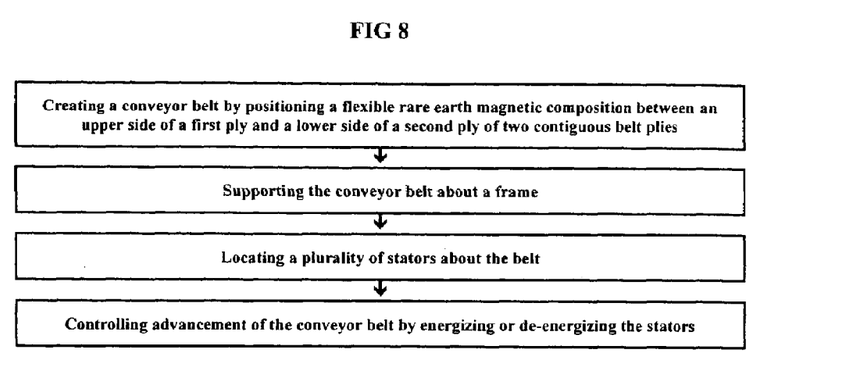
FIG. 8 is a depiction of the steps of an embodiment of the present invention.

FIG. 8 depicts the steps of creating and controlling the movement of the conveyor belt having a strip of permanent rare earth magnetic composition embedded therein.

Figure 9:
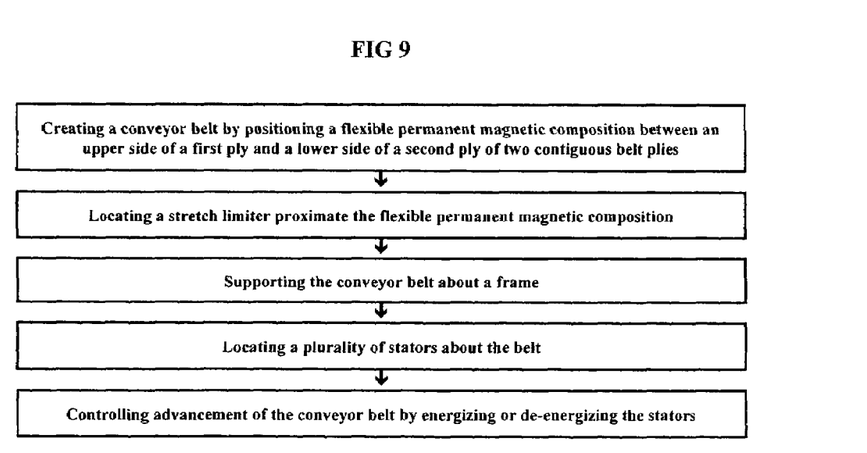
FIG. 9 is an exemplification of the steps of yet another embodiment of the current method.

Along with the creation of and the controlling of a conveyor belt, the steps of FIG. 9 further include locating a stretch limiter in the conveyor belt.

Figure 10:
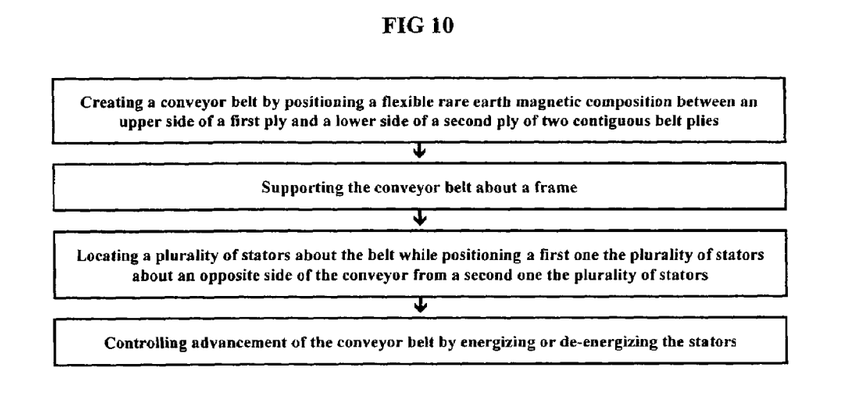
FIG. 10 is a diagrammatic representation of the steps of still another embodiment of the present invention.

Among other things, the steps disclosed in FIG. 10 describe locating at least one stator on the opposite side of the conveyor belt from at least one other stator.

Figure 11:
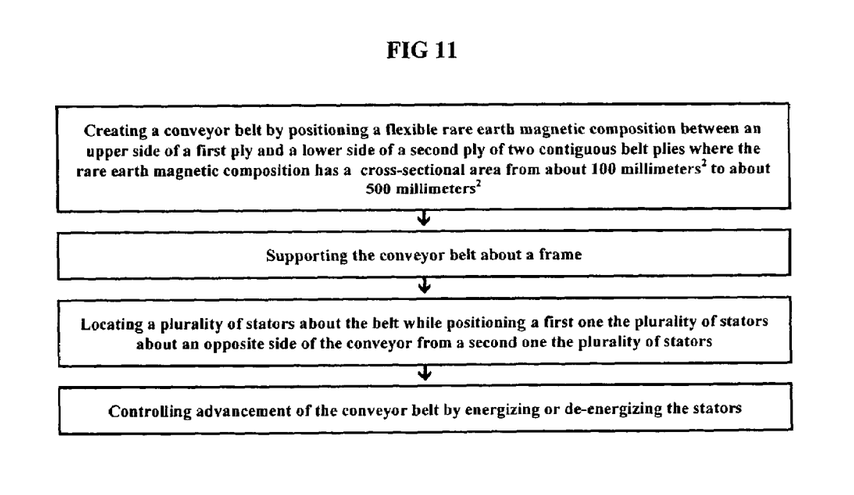
FIG. 11 is an illustration of the steps of yet another embodiment of the present method.

Among other things, the steps portrayed in FIG. 11 enable a strip of rare earth magnetic composition having a cross-sectional area from about 100 millimeters$^2$ to about 500 millimeters$^2$.

Figure 12:
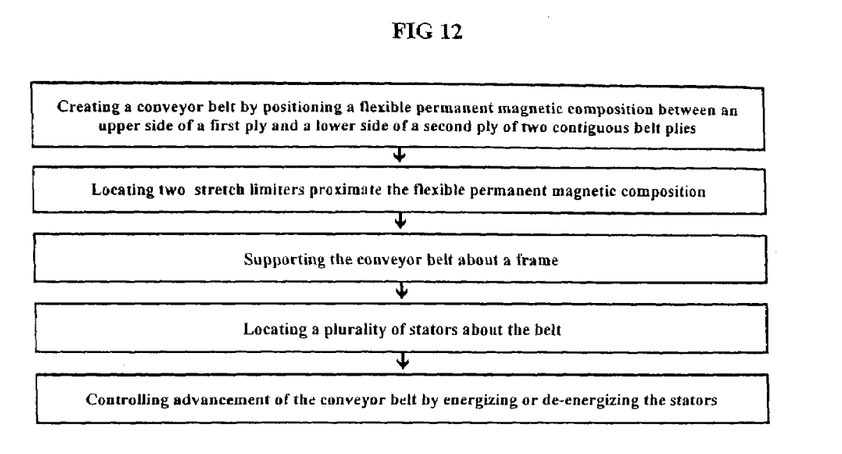
FIG. 12 is a depiction of the steps of yet another embodiment of the present method.

Among other things, the steps described in FIG. 12 enable locating two stretch limiters proximate to the strip of rare earth magnetic composition.

Figure 13:
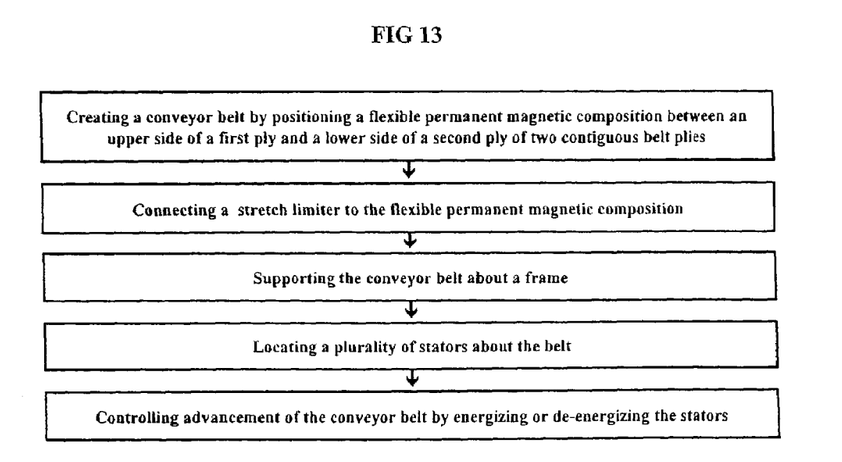
FIG. 13 is a diagrammatic representation of the steps of still another embodiment of the present invention.

Among other things, the steps described in FIG. 13 enable connecting a stretch limiter to the strip of rare earth magnetic composition.

Having disclosed the invention as required by Title 35 of the United States Code, Applicant now prays respectfully that Letters Patent be granted for his invention in accordance with the scope of the claims appended hereto.

What is claimed is:

1. A belt for transporting a load, comprising:
   a) a first ply, including a first width;
   b) a second ply, including a second width; and
   c) a flexible stratum, comprising: a permanent magnetic composition, wherein said flexible stratum:
      i) runs an extent of said belt;
      ii) is seated between the diametric peripheries of said first ply and said second ply;
      iii) can be induced to flux magnetically with a stator to push said belt; and
      iv) is of a width lesser than either said first ply's first width or said second ply's second width; and
   d) a first stretch limiting member joined to a first side of said flexible stratum and said first ply and said second ply.

2. The invention of claim 1, wherein said flexible stratum runs an entire length of said belt.

3. The invention claim 2, wherein a second stretch limiting member is positioned laterally from a second side of said flexible stratum.

4. The invention of claim 2, wherein said first stretch limiting member is joined to said second side of said flexible stratum.

5. The invention of claim 4, wherein said first stretch limiting member is adhered to said flexible stratum.

* * * * *